(12) United States Patent
Bunsen

(10) Patent No.: US 6,211,860 B1
(45) Date of Patent: Apr. 3, 2001

(54) PRESSURE SENSITIVE ELECTRONIC DEVICE

(75) Inventor: Christopher M. Bunsen, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/271,406

(22) Filed: Jul. 6, 1994

(51) Int. Cl.[7] ................................................. G09G 5/08
(52) U.S. Cl. ......................... 345/157; 345/169; 341/34; 340/825.44
(58) Field of Search ........................... 345/172, 174, 345/175, 176, 177, 901, 156, 157, 160, 163, 168, 169, 159; 178/18, 19; 368/10; 340/825.44–825.48; 341/34

(56) References Cited

U.S. PATENT DOCUMENTS

| | | | | |
|---|---|---|---|---|
| 4,313,113 | * | 1/1982 | Thornburg | 345/159 |
| 4,954,817 | * | 9/1990 | Levine | 178/18 |
| 5,088,070 | * | 2/1992 | Shiff | 368/10 |
| 5,111,005 | * | 5/1992 | Smith et al. | 345/157 |
| 5,184,120 | | 2/1993 | Schultz | 340/870 |
| 5,329,501 | * | 7/1994 | Meister et al. | 368/10 |

* cited by examiner

*Primary Examiner*—Lun-Yi Lao
(74) *Attorney, Agent, or Firm*—Curtis G. Rose

(57) ABSTRACT

A pressure sensitive electronic device has a display, a case, a processor, and a pressure sensor, such as one or more force sensitive resistors. When the pressure sensor detects pressure on the case, the information displayed on the display is changed. Pressure in one or more dimensions (X, Y, and/or Z) on the case is detected by the pressure sensor. Most commonly, the information that is changed on the display is the repositioning of a cursor on the display, although switching between various operating modes and/or writing on the device can also be performed. The cursor is repositioned corresponding to the direction and magnitude of the pressure detected on the case. Pressure can also be used to execute an operation corresponding to the position of the cursor on the display. Keys or other input devices (mouse, trackball, etc) are not required to control the movement of the cursor on the display, execute operations, or switch between various operating modes of the device.

16 Claims, 5 Drawing Sheets

PRESSURE SENSITIVE ELECTRONIC DEVICE

FIELD OF THE INVENTION

This invention relates to the electronics circuitry field. More particularly, this invention is a pressure sensitive electronic device.

BACKGROUND OF THE INVENTION

In the past, electronic devices capable of performing a wide variety of functions were quite large. The size of such devices was primarily dictated by the size of the circuitry needed to perform the functions of the device. When vacuum tubes made up the bulk of the electronic circuitry that performed these functions, these devices were at least the size of a desktop (TV, stereo receiver) and often were the size of an entire room or building (computer). In such devices, space for a keyboard or other conglomeration of keys, switches, etc, which allowed for user control of the device was not a concern, since the device itself was so large.

But technology marched on, and rapid advances were made in the miniaturization of the circuitry required to perform the functions of electronic devices. The vacuum tube gave way to the transistor. The transistor gave way to the integrated circuit. Today's VLSI (very large scale integration) circuits are capable of storing millions of transistors on a single chip. As the circuitry for electronic devices got smaller, the devices themselves got smaller. An electronic device that used to take up a whole room can now literally fit in the palm of a user's hand, or on their wrist.

While the ongoing miniaturization of electronic devices has truly been a revolution in technological progress, it has not been without its problems. One such problem is that the space for a keyboard or other conglomeration of keys, switches, etc, which allowed for user control of the device is now often the critical path that dictates the size of an electronic device. Everything from computers to watches could be made smaller and more efficient if space for user control of the device could be minimized

SUMMARY OF THE INVENTION

A pressure sensitive electronic device has a display, a case, a processor, and a pressure sensor, such as one or more force sensitive resistors. When the pressure sensor detects pressure on the case, the information displayed on the display is changed. Pressure in one or more dimensions (X, Y, and/or Z) on the case is detected by the pressure sensor. Most commonly, the information that is changed on the display is the repositioning of a cursor on the display, although switching between various operating modes and/or writing on the device can also be performed. The cursor is repositioned corresponding to the direction and magnitude of the pressure detected on the case. Pressure can also be used to execute an operation corresponding to the position of the cursor on the display. Keys or other input devices (mouse, trackball, etc) are not required to control the movement of the cursor on the display, execute operations, or switch between various operating modes of the device.

DETAILED DESCRIPTION OF THE PREFERRED EMBODIMENT

Figure 1:
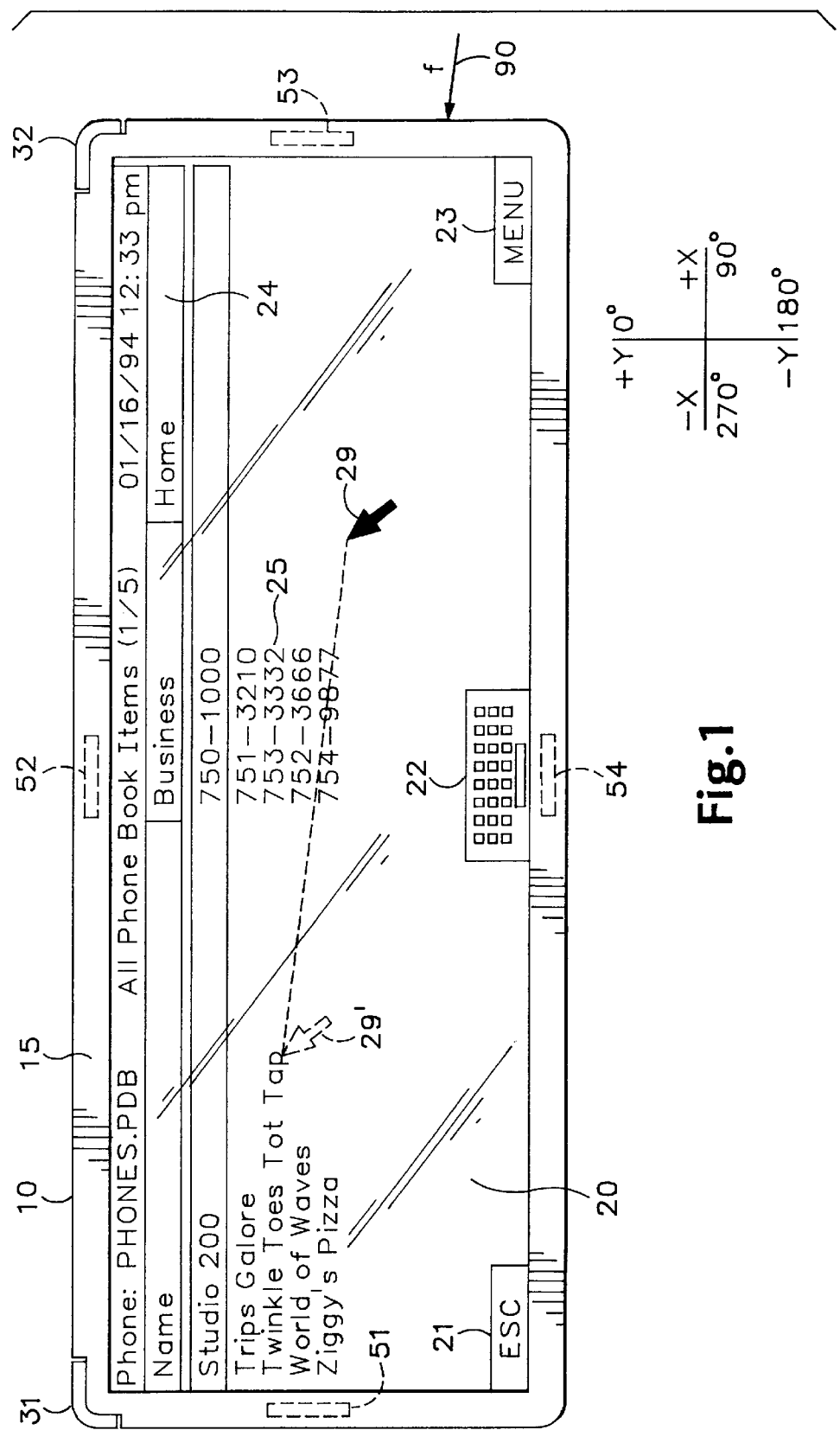
FIG. 1 shows the top view of an electronic device of the preferred embodiment of the invention.

FIG. 1 shows the top view of electronic device 10 of the preferred embodiment of the invention. Device 10 has display 20 incorporated into case 15. In the preferred embodiment, device 10 is a hand held or palmtop computer, such as those commonly referred to as a personal digital assistant (PDA). Information 21–29 is displayed on display 20. Information 21–23 are soft keys displayed on the bottom of display 20. Information 24–25 is header information and data normally part of a PDA, such as a phone book. Cursor 29 is movable about display 20 in a manner that win be discussed in more detail later. In a manner similar to buttons on a mouse or trackball, selector switches 31 and 32 execute operations on the information displayed on the display corresponding to the position of the cursor on the display. As will be described later, selector switches 31 and 32 are optional Note that there is no mechanical keyboard associated with device 10. If text entry is required, the user can select keyboard icon 22. When keyboard icon 22 is selected (e.g. by moving cursor 29 over on top of keyboard icon 22 and double clicking selector switch 31), a larger keyboard is displayed on display 10, allowing for selection of individual keys In the preferred embodiment, device 10 is the approximate size and shape of a 100LX Palmtop PC manufactured by the Hewlett-Packard Company, but with display 20 placed on top of the circuit board, and with the keyboard deleted. Those skilled in the art will appreciate that while device 10 could be any size, it is preferable that it be of a size capable of being held in a human hand or worn on the wrist or belt of a human user. The relative position of pressure sensors 51–54 are shown in dashed lines in FIG. 1, since these sensors are hidden from view by case 15. Pressure sensors 51–54 are part of pressure sensor 50, whose operation will be described in more detail later. While four sensors are shown, each orientated perpendicularly to its adjacent sensors, those skilled in the art will appreciate that more or fewer sensors could be used. In the preferred embodiment, pressure sensors 51–54 are force sensitive resistors, such as those manufactured by Interlink Electronics, although other components that can translate pressure into electronic signals, such as strain gauges, could also be used. The terms "force" and "pressure" shall be used interchangeably throughout the remainder of this document.

When pressure is applied on case 15 by a user's hand or other pressure source, such as force 90 shown in FIG. 1, information 21–29 displayed on display 20 is changed. Pressure in both the X and Y directions on case 15 is detected by pressure sensors 51–54. As shown in FIG. 1, the information that is changed on the display is the repositioning of cursor 29 on display 20 to position 29'. Cursor 29 is repositioned corresponding to the pressure detected in the X and Y direction on case 15. In the example shown in FIG. 1, the user has applied force 90 to case 15 to move cursor 29 to position 29' so she can execute an operation on the "Twinkle Toes Tot Tap" phone book entry. The operation to be executed may be anything from dialing the phone number selected, editing the entry, getting more detailed information about the entry, etc. The execution of the operation can be performed by various actuations of selector switches 31 and/or 32, or by simply allowing cursor 29 to remain in position 29' for a specified time. In addition, as wil be described in more detail later, an alternate embodiment has been contemplated where selector switches 31 and 32 are replaced by one or more additional pressure sensors that detect pressure in the Z direction. No keys or other input device (mouse, trackball, etc) are required in either embodiment to control the movement of the cursor on the display.

Figure 2:
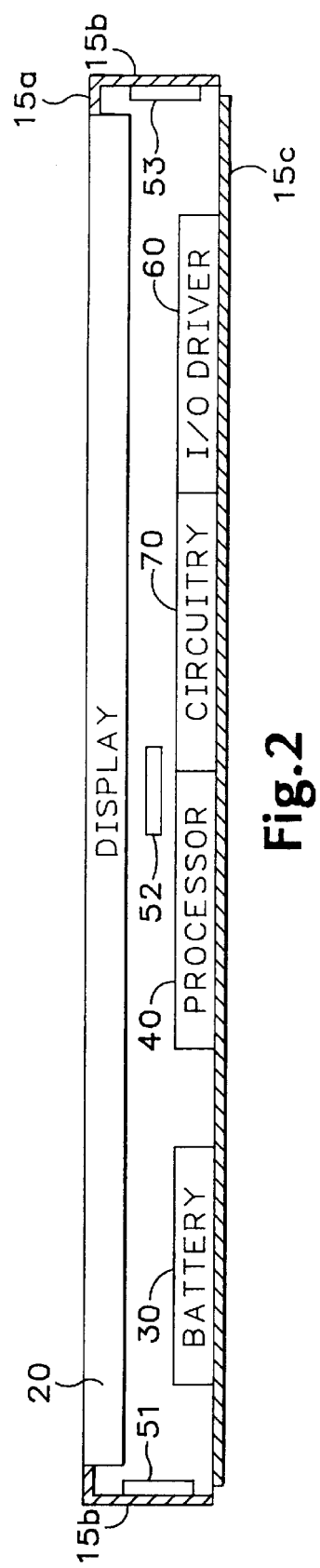
FIG. 2 shows a cut away side view of the electronic device of the preferred embodiment of the invention.

FIG. 2 shows a cut away side view of electronic device 10 of the preferred embodiment of the invention. Case 15 contains top portion 15a, side portion(s) 15b, and bottom portion 15c. In the preferred embodiment, bottom portion 15c is a rubberized material or other material with a friction coefficient that resists movement of device 10 when placed on a table or other such surface. Bottom portion 15c would not need to be of a material different than the other portions of case 15 if another approach was used that tended to counteract the external forces applied to case 15, such as securing the device to another fixed or relatively fixed surface (such as a wristband of a watch worn by a user), clipping a cradle for a pager to the belt of a user, or simply by holding the device in the palm of a user's hand.

Figure 3:
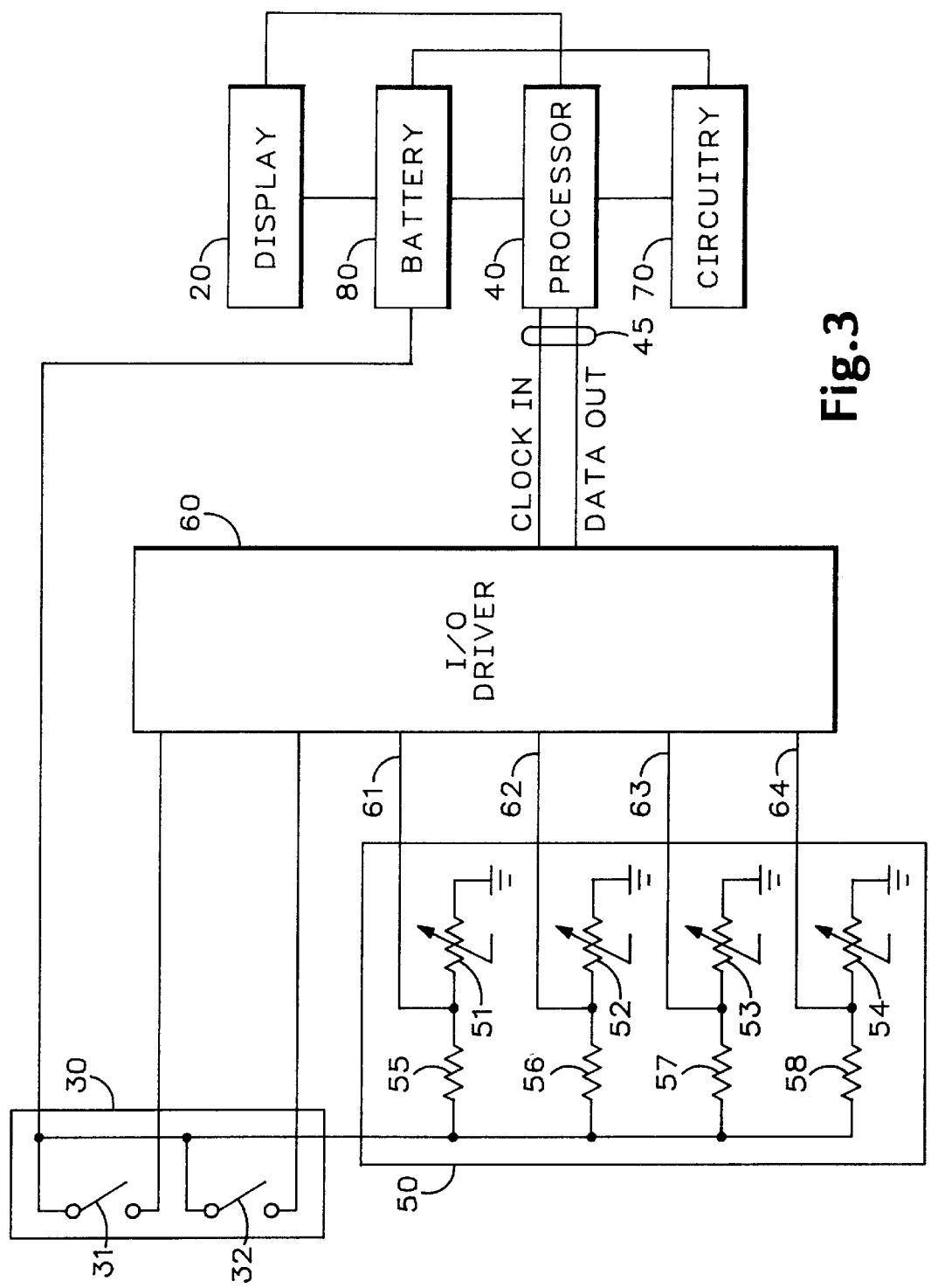
FIG. 3 shows a block diagram of the electronic device of the preferred embodiment of the invention.

FIG. 3 shows a block diagram of electronic device 10 of the preferred embodiment of the invention. Battery 80 is connected to display 20, selection circuitry 30, processor 40, pressure sensor 50, I/O driver 60, and other circuitry 70. As previously discussed, pressure sensor 50 includes force sensitive resistors 51–54. Pressure sensor 50 also includes fixed pull up resistors 55–58. Pull up resistors 55–58 form a voltage divider network with force sensitive resistors 51–54. The signals provided to I/O driver 60 on input lines 61–64 are proportional to the force applied to force sensitive resistors 51–54. When force sensitive resistors 51–54 are oriented as shown in FIG. 1, the signal on input line 64 will be proportional to the force applied on case 15 in a +Y direction of 0°. Likewise, the signal on input line 61 will be proportional to the force applied im a +X direction of 90°, the signal on input line 62 will be proportional to the force applied in a –Y direction of 180°, and the signal on input line 63 will be proportional to the force applied in a –X direction of 270°. For example, force 90 shown in FIG. 1 would result in a signal on input line 63 to indicate the –X directional component of force 90, and a sign on input line 64 to indicate the Y directional component of force 90. Those skilled in the art will appreciate that while two pairs of force sensitive resistors are used in the preferred embodiment ("X" resistor pair 51 and 53, and "Y") resistor pair 52 and 54), resistors 53 and 54 would not be necessary if resistors 51 and 52 were preloaded to a predefined amount of force, so that "negative pressure" on the resistors (e.g., force on resistors 51 and 52 from force 90 of FIG. 1) could be measured. In the preferred embodiment, the signals (if any) resulting from the "pair" of any force sensitive resistor measuring positive pressure is simply ignored, since the direction of the force on case 15 can be uniquely determined from the signals resulting from the force sensitive resistors measuring positive pressure.

Through the combination of the signals on input lines 61–64, 10 driver 60 can uniquely determine the direction of any X–Y force applied to case 15, as well as the amount of force applied. Those skilled in the art will appreciate that I/O driver 60 is similar in many respects to driver circuitry found in conventional input devices, such as mice and trackballs, that receive positional data from X–Y rollers or similar devices. This positional data, as well as the data from selector circuitry 30 (made up of switches 31 and 32 in the preferred embodiment) is sent by I/O driver 60 to processor 40 over lines 45 using a specific clocked protocol, such as RS-232 clocked protocol, understandable by processor 40. Processor 40, responsive to signals sent to it over lines 45, causes the information contained on display 20 to change, as was discussed in FIG. 1 with the change of the position of cursor 29 to position 29'. Circuitry 70 is other special purpose circuitry, such as a modem, pager, sound card, etc that is optionally present to perform some of the functions of device 10.

Figure 4:
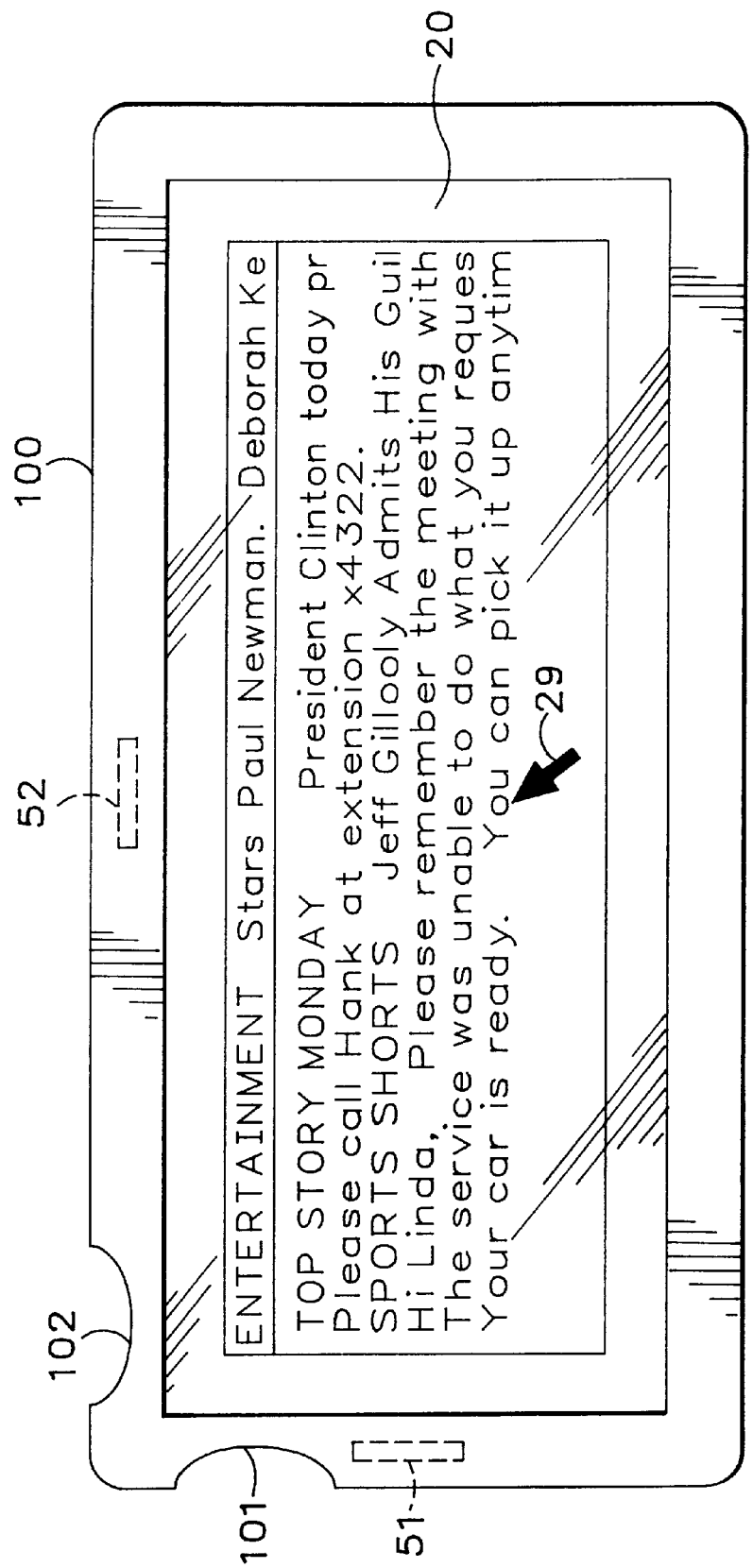
FIGS. 4–6 show electronic devices of alternate embodiments of the invention.
Figure 5:
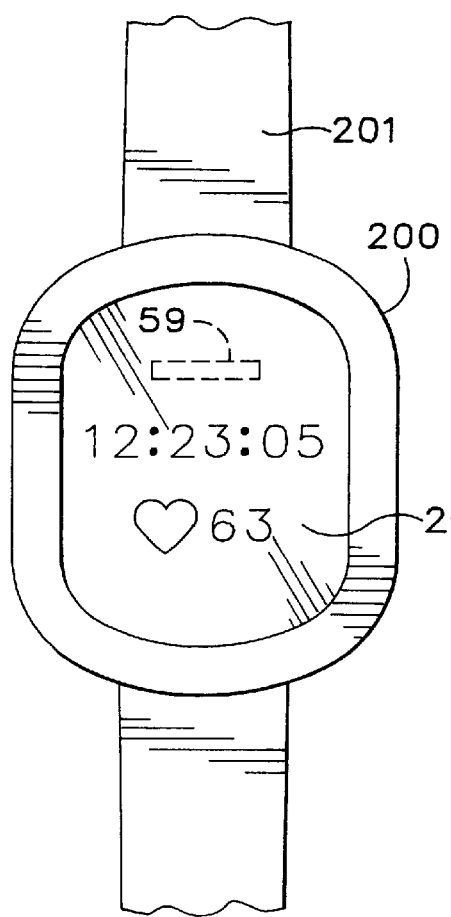
Figure 6:
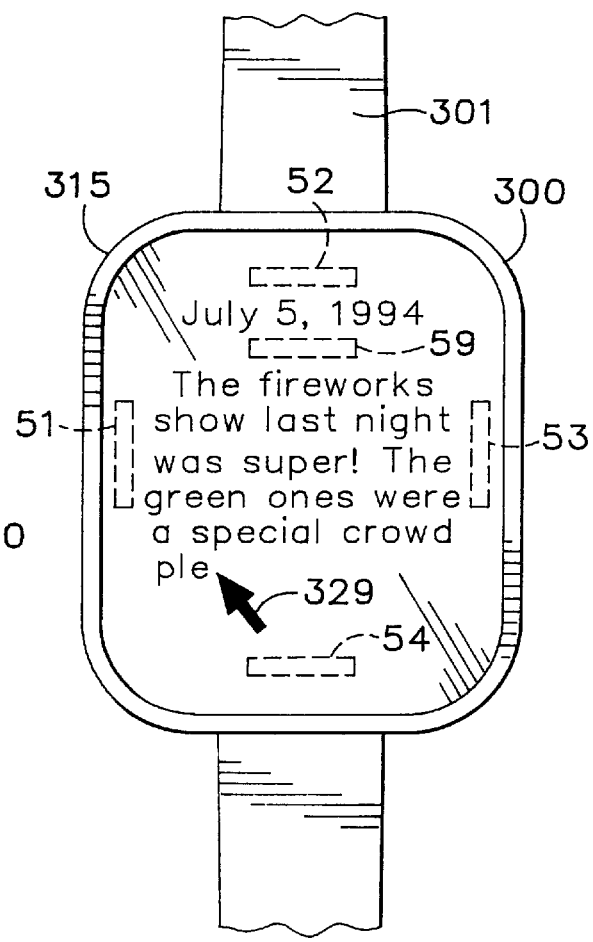

FIGS. 4–6 show electronic devices of alternate embodiments of the invention. FIG. 4 shows device 100. Like device 10, device 100 has display 20 and force sensitive resistors 51 and 52. Indentations 101 and 102 accommodate the thumb and forefinger of a user's left hand. Force is applied to device 100 through the thumb and forefinger of a user's hand placed in indentations 101 and 102. In this embodiment, only two force sensitive resistors are needed, since force sensitive resistors 51 and 52 have been preloaded (as discussed above) to sense both positive and negative pressure. In this embodiment, device 100 is an alphanumeric pager similar in appearance (although not in function) to the Advisor pager manufactured by the Motorola Corporation.

FIG. 5 shows device 200. Force is applied to device 200 by pressing on device 200, such as by pushing down on display 20 with a forefinger or palm. Unlike devices 10 and 100, device 200 does not have cursor 29 and therefore does not need to detect pressure in all directions in a multidimensional plane. Instead, force sensitive resistor 59 detects pressure in a Z direction applied to the top of device 200, and is used to switch between multiple operating modes of device 200. In this embodiment, device 200 is a multifunction watch or exercise monitor capable of telling time and performing other tasks, such as acting as a stopwatch, monitoring a user's pulse rate, etc. The user can switch between the various operating modes, update the time of day, etc, merely by various applications of pressure on the top of device 200 (e.g., long and short duration of pressure, multiple applications of pressure of a short duration, etc). Note that device 200 lacks any keys, knobs, dials, switches, or pushbuttons of any kind. It is the mere application of pressure on the top of device 200 that controls its operation.

Devices 10 or 100 can be modified to detect pressure in a Z direction by adding force sensitive resistor 59 to these devices. The ability to detect pressure in three dimensions increases the power and function of devices 10 and 100. For example, the detection of pressure in a Z direction could perform the function of selection circuitry 30 (FIG. 3) and eliminate switches 31 and 32 from device 10. Alternatively, the detection of pressure in a Z direction could simply turn the device off, or result in the movement of cursor 29 into or out of a three dimensional object or stack of windows displayed on display 20.

FIG. 6 shows device 300. Device 300 as shown is similar in size to device 200, but is capable of performing the PDA functions of larger devices, such as device 10. In particular, device 300 is capable of performing the popular PDA function of "writing" on the device, similar to pen-based PDA's such as the Apple Newton, but without the pen or any other writing device. Instead, the user writes by applying pressure to case 315 of device 300, thereby moving cursor 329 along in much the same manner as a pencil is moved across a piece of paper when one is writing a letter or the like. In effect, device 300 becomes not only the electronic representation of the piece of paper, but also the pencil itself While cursor 329 is helpful in providing positional feedback to a user, it is not required to be displayed to the user. Force sensitive resistor 59 detects pressure in the Z direction in a manner similar to that discussed above, and can be used to control device 300 by scrolling down/up, selecting an item from a menu, etc.

What is claimed is:

1. An electronic device comprising:

a case, said case having a top portion, a side portion, and a bottom portion;

a display having information displayed thereon, said display incorporated into said case, said information including a cursor in a first position;

a processor contained in said case, said processor connected to said display; and a pressure sensor, operatively coupled to said case and to said processor, for detecting pressure on said side portion of said case without the use of keys or other input devices, said processor sending signals to said display causing the cursor on said display to move from said first position in a first direction to a second position, responsive to said pressure sensor detecting pressure on said side portion of said case in said first direction.

2. The electronic device of claim 1, wherein said pressure sensor detects pressure in a Y direction on said side portion of said case.

3. The electronic device of claim 1, wherein said pressure sensor detects pressure in an X direction on said side portion of said case.

4. The electronic device of claim 2, wherein said pressure sensor detects pressure in an X direction on said side portion of said case.

5. The pressure sensor of claim 4, further comprising:

a plurality of force sensitive resistors oriented on said case to detect pressure in both said X direction and said Y direction on said side portion of said case.

6. The electronic device of claim 5 further comprising:

selection circuitry for executing an operation on the information displayed on said display, said operation corresponding to the position of said cursor on said display.

7. The electronic device of claim 4, wherein said pressure sensor detects pressure in a Z direction on said top portion of said case without the use of keys or other input devices.

8. The electronic device of claim 1, wherein said pressure sensor detects pressure in a Z direction on said top portion of said case without the use of keys or other input devices.

9. The electronic device of claim 1, wherein said electronic device is a hand held computer.

10. The electronic device of claim 1, wherein said electronic device is a pager.

11. The electronic device of claim 1, wherein said electronic device is a watch.

12. A method of changing information displayed on a display of an electronic device, said electronic device having a case, a processor, and a pressure sensor operatively coupled to said case and to said processor, said case having a top portion, a side portion and a bottom portion, said method comprising the steps of:

said pressure sensor detecting pressure in a first direction on said side portion of said case without the use of keys or other input devices; and moving a cursor displayed on said display from a first position in said first direction to a second position, responsive to detecting said pressure on said side portion of said case in said first direction.

13. The method of claim 12, wherein said detecting step detects pressure in a Y direction on said side portion of said case.

14. The method of claim 13, wherein said detecting step detects pressure in an X direction on said side portion of said case.

15. The method of claim 14, further comprising the step of: executing an operation on the information displayed on said display, said operation corresponding to the position of said cursor on said display.

16. The method of claim 14, wherein said detecting step detects pressure in a Z direction on said top portion of said case without the use of keys or other input devices.

* * * * *